(12) United States Patent
Huang et al.

(10) Patent No.: US 9,263,756 B1
(45) Date of Patent: Feb. 16, 2016

(54) ELECTROCHEMICAL METHOD FOR THE REMOVAL OF PPM LEVELS OF CARBON MONOXIDE FROM HYDROGEN FOR A FUEL CELL

(75) Inventors: Cunping Huang, Cocoa, FL (US); Ruichun Jiang, Rochester, NY (US); Mohamed Elbaccouch, Orlando, FL (US); Nazim Muradov, Melbourne, FL (US); James M. Fenton, Merritt Island, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 2281 days.

(21) Appl. No.: 11/732,794

(22) Filed: Apr. 4, 2007

Related U.S. Application Data

(60) Provisional application No. 60/789,302, filed on Apr. 5, 2006.

(51) Int. Cl.
*H01M 8/06* (2006.01)
*H01M 8/10* (2006.01)
*H01M 8/04* (2006.01)

(52) U.S. Cl.
CPC ........ *H01M 8/0668* (2013.01); *H01M 8/04126* (2013.01); *H01M 8/0662* (2013.01); *H01M 8/0675* (2013.01); *H01M 8/1018* (2013.01)

(58) Field of Classification Search
CPC .................................................. H01M 8/0668
See application file for complete search history.

(56) References Cited

U.S. PATENT DOCUMENTS

| 5,207,877 A * | 5/1993 | Weinberg et al. ............. 423/210 |
| 6,245,214 B1 * | 6/2001 | Rehg et al. .................... 205/764 |
| 6,787,229 B1 | 9/2004 | Muradov ....................... 428/367 |
| 2005/0136299 A1 * | 6/2005 | Richey et al. ................... 429/17 |
| 2005/0163706 A1 * | 7/2005 | Reichman et al. ............ 423/655 |

OTHER PUBLICATIONS

C. He, H. R. Kunz, and J. M. Fenton, "Selective Oxidation of CO in Hydrogen Under Fuel Cell Operating Conditions," *J. Electrochem. Soc.*, 148(10) (2001) pp. A1116-A1124.

N. Muradov, F. Smith, and A. T-Raissi, "Catalytic Activity of Carbons of Methane Decomposition Reaction," *Catal. Today*, 102-103 (2006) pp. 225-233.

(Continued)

*Primary Examiner* — Barbara Gilliam
*Assistant Examiner* — Stephan Essex
(74) *Attorney, Agent, or Firm* — Jeffer & Associates, P.A.

(57) ABSTRACT

An electrochemical water gas shift system for removing low level carbon monoxide from hydrogen stream. The system including an electrolyzer having a porous anode for absorbing carbon monoxide from a hydrogen stream as a feed stream for a polymer electrolyte membrane fuel cell for generating an electrical energy, a small portion of electricity generated by the fuel cell is applied to the electrolyzer to convert carbon monoxide adsorbed in the porous anode to carbon dioxide and hydrogen via an electrochemical gas shift reaction without oxygen or air input. In an embodiment, the system includes a first electrolyzer operating as a CO adsorber and a second electrolyzer connected in parallel with the first electrolyzer operating as a CO remover. Two electrolyzers can be operated alternatively as CO adsorber and CO remover.

11 Claims, 8 Drawing Sheets

(56) References Cited

OTHER PUBLICATIONS

Y. Chen, B. Liaw, and H. Chen, "Selective Oxidation of Co in Excess Hydrogen Over $CuO/Ce_xZr_{1-x}O_2$ Catalysts," *Int. J. Hydrogen Energy*, 31 (2006) pp. 427-435.

G. Zhou, Y. Jiang, H. Xie, and F. Qui, "Non-noble Metal Catalyst for the Carbon Monoxide Selective Oxidation in Excess Hydrogen," *Chem. Eng. J.*, 109 (2005) pp. 141-145.

O. Goerke, P. Pfeifer, and K. Schubert, "Water Gas Shift Reaction and Selective Oxidation of CO in Micro reactors," *Appl. Catal. A: General*, 263 (2004) pp. 11-18. Abstract Only.

R. Jiang' H. R. Kunz and J. M., "Electrochemical Oxidation of $H_2$ and $H_2/CO$ Mixtures in Higher Temperature ($T_{cell}$> 100° C.) Proton Exchange Membrane Fuel Cells: Electrochemical Impedance Spectroscopy," *J. Electrochem. Soc.*, 152(7) (2005) pp. A1329-A1341.

\* cited by examiner

ELECTROCHEMICAL METHOD FOR THE REMOVAL OF PPM LEVELS OF CARBON MONOXIDE FROM HYDROGEN FOR A FUEL CELL

This application claims the benefit of priority of U.S. Provisional Application No. 60/789,302 filed on Mar. 5, 2006.

FIELD OF THE INVENTION

This invention relates to removal of carbon monoxide from hydrogen stream and, in particular, to methods, systems, apparatus and devices using an electrochemical method for on-board deep removal of low level carbon monoxide and other impurities from hydrogen streams for a polymer electrolyte membrane fuel cell applications.

BACKGROUND AND PRIOR ART

Carbon monoxide (CO) is one of the most common impurities in hydrogen ($H_2$) streams that have a great negative impact on the performance and durability of polymer electrolyte membranes (PEM). Just 10 ppm of CO in $H_2$ fuel stream can cause degradation in the performance and durability of fuel cells. The on-board removal of low level CO from $H_2$ rich stream to less than 10 ppm is a challenging task. The current available technologies are precluded from applicability because of their high cost, poor selectivity, and elevated temperature and pressure requirements. In addition, these technologies suffer from significant $H_2$ loss.

$H_2$ is generally generated from hydrocarbons, natural gas, or methanol via steam methane ($CH_4$) reformation (SMR) ($H_2O+CH_4 \rightleftharpoons CO+3H_2$) followed by a water gas shift (WGS) reaction ($H_2O+CO \rightleftharpoons CO_2+H_2$). The gas effluent contains approximately 2.0 vol. % CO in excess $H_2$. This low concentration of CO in the $H_2$ outlet stream from WGS can not be avoided and a deep removal process is required. Apparatus, system and processes for eliminating the CO in the $H_2$ fuel stream are beneficial in increasing the performance and durability of polymer electrolyte membrane fuel cells.

Present technologies for on board CO removal can be separated into off-fuel cell approach and on-fuel cell approach. The former removes CO from the $H_2$ fuel in advance of the fuel cell apparatus, while the latter process is integrated within the fuel cell. In the off-fuel cell CO removal, the goal is to maximize the adsorption of CO on the catalyst surface. However, in the on-fuel cell CO removal, the objective is to minimize the CO adsorption on the fuel cell anode-catalyst.

The prior art technologies for the on-board removal of CO for automotive applications have limitations. Considering a 100 horsepower (75 kW) automobile powered by $H_2$, under the assumption that an H2 fuel cell is operated at 0.75 V with a 50% overall efficiency, the electrical current required from the fuel cell can be calculated as 200 kA. Based on Faraday's Law, theoretical (or minimum) $H_2$ flow rate required for a PEM fuel cell to generate 1 A current can be calculated for both anode and cathode reactions as:

Based on an anode hydrogen oxidation reaction: $H_2 = 2H^+ + 2e^-$, one mole of $H_2$ makes 2 equivalents (n=2 eq./mole). Therefore, a 1 A (1 A=1 coulomb/sec) current is produced by an $H_2$ flow (at standard conditions):

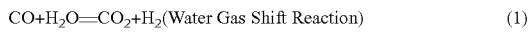

If the calculation is based on a cathode reaction: $4H^+ + O_2 + 4e^- = 2H_2O$, n=4 eq./mole, then 1 A current requires:

So 200 kA current requires: 6.97/2×200/2=1394/2 L/min.

It should be pointed out that the above flow rate (1394/2 L/min) represents minimum $O_2$ flow that is equal to 2 times of $H_2$ based on the reaction: $2H_2+O_2=2H_2O$. So the theoretical $H_2$ flow rate should be:

2×$O_2$ flow rate=2×(1394/2)=1394 L/min.

Assuming CO removal residence time is 10 seconds; the reactor volume can be calculated as 232.4 L. If the reaction rate could be reduced to 0.1 second, the reactor volume could be reduced to 2.3 L.

In order to have a better understanding of the challenges and the principles for the removal of low concentration CO in an $H_2$ stream, some analyses and discussions are needed.

Off-fuel cell CO removal methods include Pd-based membrane purification, water gas shift (WGS) reaction, catalytic methanation, and catalytic preferential CO oxidation as follows:

$$CO+H_2O \rightleftharpoons CO_2+H_2 \text{(Water Gas Shift Reaction)} \qquad (1)$$

$$CO+3H_2 \rightleftharpoons CH_4+H_2O \text{(CO methanation)} \qquad (2)$$

$$CO+O_2 \rightleftharpoons CO_2 \text{(Preferential Oxidation)} \qquad (3)$$

Pd-based membrane purification method is expensive and requires both high operating temperature and a high-pressure differential. Therefore, it is not suitable for on board applications. Thermocatalytic WGS processes, including high temperature and low temperature WGS reactions, are suitable for treatment of different CO concentrations. The low temperature WGS is normally operated at temperatures as high as 200° C. to ensure a reasonable reaction rate, and therefore can not be used for on-board applications based on the temperature requirement. Catalytic CO methanation is the hydrogenation of CO on supported metal catalysts in $H_2$ fuel. The advantages of the methanation process are that it avoids the introduction of $O_2$ or air to the fuel cell system, and the generated methane ($CH_4$) gas does not deactivate the fuel cell anode catalyst. However, its disadvantages are the consumption of $H_2$ and the requirement of high temperature. The CO preferential oxidation process uses less than 2 percent of air by volume mixed with the $H_2$ fuel stream and fed into a metal-based catalyst. This catalyst preferentially adsorbs CO, which then reacts with $O_2$ to form $CO_2$. The typical metal catalysts for the oxidation of CO are alumina-supported Pt-group metal catalysts and metal oxide-supported gold (Au) catalysts. In this oxidation process, part of $H_2$ is oxidized to produce water resulting in a fuel loss. A great effort has been devoted to reduce the temperature to lower than 80° C. for the preferential process in order to be applicable in an $H_2$ PEM fuel cell system. Some important advances of prior art catalytic preferential CO oxidation are summarized below.

Fenton et al. reported an approximately 100% CO conversion with an Ir/COOx-$Al_2O_3$/carbon catalyst at an $O_2$/CO ratio of 1.5 in a humidified $H_2$ environment and a temperature near 75° C. as described in C. He, H. R. Kunz, and J. M. Fenton, Selective Oxidation of CO in Hydrogen Under Fuel Cell Operating Conditions, J. Electrochem. Soc., 148(10) (2001), pp. A1116-A1124. They also showed that Co—Ru/C catalysts are very effective for CO methanation. Muradov and co-workers investigated the catalytic activity of a wide range of carbon-based materials and examined their structural and surface properties as described in N. Muradov, F. Smith, and A. T-Raissi, Catalytic Activity of Carbons for Methane Decomposition Reaction, Catal. Today, 102-103 (2006), pp. 225-233. Chen and co-workers reported a 100% conversion of CO oxidation using 7% $CuO/CeO_2$ catalysts in an $H_2$ rich environment ($H_2/CO/O_2/He=50/1/1/48$) at 87-147° C. as described in Y. Chen, B. Liaw, and H. Chen, Selective Oxidation of Co in Excess Hydrogen Over $CuO/Ce_xZr_{1-x}O_2$ Catalysts, Int. J. Hydrogen Energy, 31 (2006), pp. 427-435. Furthermore, the partial substitution of the Ce lattice with $Zr^{+4}$ (7% $CuO/Ce_{0.9}Zr_{0.1}O_2$) resulted in 100% CO conversion at approximately 77° C. Zhou et al. showed that CO conversion in excess $H_2$ can reach up to approximately 99.5% at a temperature range between 130-150° C. in the presence of Co—Ni supported activated carbon (AC) catalysts as described in G. Zhou, Y. Jiang, H. Xie, and F. Qiu, Non-noble Metal Catalyst for the Carbon Monoxide Selective Oxidation in Excess Hydrogen, Chem. Eng. J., 109 (2005) pp. 141-145. Goerke reported a 95% selective oxidation of CO in microchanneled reactors using $Ru/ZrO_2$ catalysts at 150° C. and average residence time of 14 ms as described in O. Goerke, P. Pfeifer, and K. Schubert, Water Gas Shift Reaction and Selective Oxidation of CO in Micro reactors, Appl. Catal. A: General, 263 (2004) pp. 11-18.

However, it is should be noted that it is difficult for any of these three methods to completely remove CO because, fundamentally, the ppm level of CO is thermodynamically stable in an $H_2$ stream at ambient conditions. To remove low concentration CO from an $H_2$ fuel stream requires a two-step process in order to overcome these thermodynamic obstacles. The first step is the preferential adsorption of CO on metal-based catalysts to increase the CO concentration locally because CO has a higher catalytic adsorption capability than $H_2$. The second step is the thermochemical conversion of CO to $CO_2$ (Reaction 2) or $CH_4$ (Reaction 3). The two-step process can be described in Reactions 4 and 5 or Reactions 4 and 6.

$$H_2 + CO(ppm) + M(catalyst) = H_2 + M\text{-}CO \text{ (preferential adsorption)} \quad (4)$$

$$M\text{-}CO + O_2 = CO_2 + M \text{ (CO selective oxidation)} \quad (5)$$

$$M\text{-}CO + 3H_2 = CH_4 + H_2O + M \text{ (CO methanation)} \quad (6)$$

Note that Reaction 4 is favored at low temperatures to ensure the adsorption rates, whereas CO oxidation and methanation require a higher temperature to enhance reaction kinetics. Therefore, there exists a contradictory condition favoring both CO adsorption and the CO reaction kinetics. On the other hand, it is essential to recognize that for the on-board removal of CO the reaction temperatures can not exceed the fuel cell optimal operating temperature of 80° C. If the reaction temperature is at 80° C. or below, the low reaction rates for Reactions 5 or 6 would require large reactor volume or complicated reactor configurations to compensate the slow reaction rate.

Low-level CO in an $H_2$ stream can also be removed on fuel cell anodes. The advantage of on-fuel cell CO treatment is that no additional processing is required. Three fundamental technologies have been reported for on-fuel cell applications: high temperature process, air- or $O_2$ bleeding, and anode catalyst alloying.

In the high temperature process Fenton and co-workers showed that CO adsorption on fuel cell anode catalysts was reduced at temperatures higher than 100° C., thereby alleviating the CO poisoning effects. This is due to the fact that CO adsorption on a Pt catalyst exhibits high negative standard entropy. However, increasing the PEM fuel cell operating temperature might have some adverse impacts on fuel cell performance. Firstly, higher operating temperature greatly increases the resistance of the Nafion® membrane, resulting in a reduction of fuel cell performance. In order to maintain the membrane's low resistance a 100% relative humidity is preferred. When temperature is above 100° C., maintaining high humidity for a PEM fuel cell requires a system pressure greater than 1 atm, which again reduces the efficiency of the fuel cell. Secondly, operating a PEM fuel cell at temperature greater than 100° C. will enhance the aggregation rate of Pt particles as well as the Pt dissolution in the fuel cell electrocatalyst layer, both of which decrease the performance of the cell. Finally, above 100° C. PEM fuel cells suffer a higher rate of membrane degradation, shortening their long-term stability.

In the approach of air or $O_2$ bleeding, air or $O_2$ is introduced into the $H_2$ stream feed to the anode of a PEM fuel cell to oxidize CO adsorbed on the anode catalyst. This technology has been extensively reported and the results have shown some alleviation of the deleterious effect of CO in the $H_2$ stream. However, since the $H_2$ combustion limit is only 5% of $O_2$ in the $H_2$ stream, a malfunction of the $O_2$ inlet flow could result in very undesirable consequences. Also, as indicated in literature, air-bleeding technology is only effective at a very low CO level (i.e. less than 50 ppm) and at low $H_2$ flow rates. As discussed previously, a hydrogen-powered vehicle requires a very high $H_2$ flow rate (minimum 1394 L/min for a 75 kW vehicle). Therefore, air-bleeding technology is unlikely to be suitable for on-board CO removal in a PEM fuel cell system.

For the anode catalyst alloying approach, considerable efforts have been made to develop CO tolerant electrocatalysts. It has been found that adding Ru, Rh or Ir catalysts to the Pt anode reduces CO poisoning, but it can not fundamentally eliminate CO poisoning. Other alloys such as Pt—Sn and Pt—Mo have been investigated. Still, the Pt—Ru alloys are the most promising candidates and have attracted the most attention. Furthermore, at an 80° C. fuel cell operating temperature the Pt alloy method is unable to completely resolve the CO poisoning issue.

What is needed is a process for removing low level CO to improve the performance of PEM fuel cell to the level of a pure $H_2$ stream.

SUMMARY OF THE INVENTION

A primary objective of the invention is to provide apparatus, methods, systems and devices for the on-board infinite removal of a ppm level of CO from $H_2$ rich stream for polymer electrolyte membrane fuel cell applications.

A secondary objective of the invention is to provide apparatus, methods, systems and devices for a process to adsorb highly harmful impurity gases such as hydrogen sulfide ($H_2S$), sulfur dioxide ($SO_2$), nitrogen oxides (NOx), and ammonia ($NH_3$)

A third objective of the invention is to provide apparatus, methods, systems and devices for an aqueous electrolyte to enhance the CO absorption in the electrolyzer.

A forth objective of the invention is to provide apparatus, methods, systems and devices for a high efficiency and low cost CO adsorption/oxidation metal-based catalysts to maximize the storage capability of the electro-catalyst layer of the electrolyzer.

A fifth objective of the invention is to provide apparatus, methods, systems and devices for on-board infinite removal of a ppm level of CO from $H_2$ rich stream for application in hydrogen powered vehicles.

A sixth objective of the invention is to provide apparatus, methods and systems for eliminating the CO in the $H_2$ fuel stream to increasing PEM fuel cells performance and durability.

A first preferred embodiment of the invention provides a method for removal of a low level carbon monoxide from hydrogen stream. First, a hydrogen stream having low level carbon monoxide is introduced into an electrolyzer. Simultaneously, carbon monoxide in the hydrogen stream is adsorbed into a porous anode of the electrolyzer. The electrochemical water gas shift is performed at ambient temperature and pressure and 100% relative humidity. The method includes oxidizing the carbon monoxide absorbed in the catalyst to carbon dioxide, wherein the oxidation does not require on-board oxygen or air supplies, nor converting the carbon monoxide to methane through a methanation process. In an embodiment, electrical energy is generated by an on-board polymer electrolyte membrane fuel cell that is fed the hydrogen stream and is applied through a controller to the elecrolyzer to carryout the electrochemical water gas shift. Additionally, the method includes adsorbing sulfur-based compound gases into the electrolyzer anode and removing the sulfur-based compound gases.

In the second embodiment, the novel electrochemical water gas shift system removes low level carbon monoxide from a hydrogen stream. The system includes an electrolyzer having a cathode and an anode. The porous outer surface of the anode for absorbing carbon monoxide from a hydrogen stream and purified hydrogen is fed into a polymer electrolyte membrane fuel cell for generating an electrical energy. In an embodiment, the system includes a first electrolyzer operating as a carbon monoxide adsorber and a second electrolyzer connected in parallel with the first electrolyzer operating as a carbon monoxide remover via electrochemical water gas shift reaction. The first and second electrolyzer are operated approximately simultaneously in one reactor and a carbon monoxide breakthrough time of the carbon monoxide adsorption is greater than a carbon monoxide removal time. The fuel cell is a polymer electrolyte membrane fuel cell and the fuel cell is an on board fuel cell, and alternatively is an off-board fuel cell.

Further objects and advantages of this invention will be apparent from the following detailed description of preferred embodiments which are illustrated schematically in the accompanying drawings.

DESCRIPTION OF THE PREFERRED EMBODIMENTS

Figure 1:
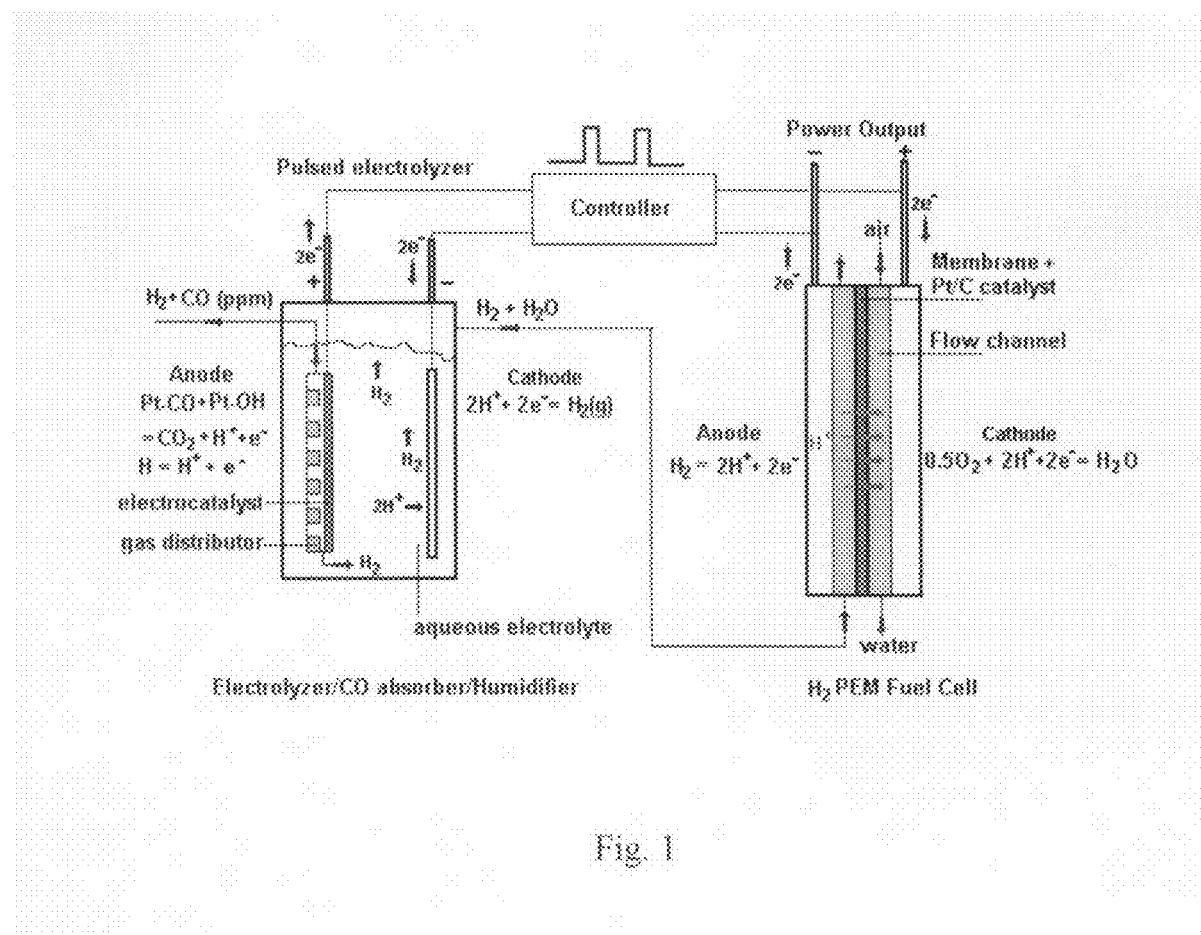
FIG. 1 is a schematic flow diagram of a system for the deep removal of a low level CO from $H_2$ feed stream.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a partial list of abbreviations used throughout the application:
PEM polymer electrolyte membrane
WGS water gas shift
EWGS electrochemical water gas shift Carbon monoxide (CO) in hydrogen ($H_2$) stream can cause severe performance degradation for an $H_2$ polymer electrolyte membrane (PEM) fuel cell. The on-board removal of CO from a $H_2$ stream requires a removal process temperature less than 80° C., and a fast removal reaction rate in order to minimize the reactor volume. At the present time, few technologies have been developed that meet these two requirements. The present invention describes an electrochemical water gas shift process to remove low concentration CO for the on-board application of a PEM fuel cell at ambient temperature and pressure with 100% of relative humidity. No on-board oxygen or air supplies are needed for carbon monoxide oxidation in this invention.

Most commercial $H_2$ is produced from natural gas via steam methane reformation (SMR) followed by a water gas shift (WGS) reaction in which CO is oxidized to carbon dioxide $CO_2$ while water is reduced to $H_2$. The gas effluent from the WGS varies from a few ppm CO to 2% CO by volume in excess of $H_2$. This low concentration of CO in the $H_2$ outlet stream from the WGS can not be avoided. However, eliminating the CO is essential to enhance the performance of PEM fuel cells. As discussed previous a two-step process is needed.

In the preferred embodiment of the present invention includes two steps. First CO concentration on the surface of a catalyst is locally increased by a preferential adsorption process to separate it from $H_2$. Second, CO adsorbed is oxidized into $CO_2$ by oxygen. Differing from CO oxidation or methanation processes, a WGS reaction not only removes the CO, but also uses CO as a reducing reagent to reduce water for the production of additional $H_2$. In this invention, electrical energy is used to replace thermal heat for removing CO from $H_2$ while reducing water to produce $H_2$ via the EWGS reaction. The process is potentially applicable for on-board removal of CO because it can be operated at ambient temperatures and atmospheric pressures.

The method, system, apparatus and device of the present invention consists of an electrolyzer, modified from a humidifier, and on-board polymer electrolyte membrane (PEM) fuel cell. The electrolyzer operates at ambient conditions of approximately 25° C. and 1 atm with 100 humidity, while the fuel cell operates at approximately 60 to approximately 80° C. and 1 atm. The system operates without the need of oxygen ($O_2$) input or other additional devices. A low level CO in the $H_2$ rich stream is introduced to the porous anode of the electrolyzer, where it is preferentially adsorbed onto the surface of the electrode. Also CO can be absorbed by the aqueous electrolyte of the electrolyzer. A small portion of electricity generated from the fuel cell is applied to the electrolyzer to oxidize CO adsorbed on the anode surface forming $CO_2$, which dissolves in water. $H_2$ produced on the cathode via the EWGS reaction combines with the purified $H_2$ stream and fed to the fuel cell. The whole process takes place with minimum energy loss, approximately 60 percent efficiency. The process is described with the following electrochemical reactions.

$$H_2O + electricity = H_2 + \tfrac{1}{2} O_2$$

$$CO + \tfrac{1}{2} O_2 = CO_2$$

Overall reaction: $H_2O + CO(adsorbed) + electricity = H_2 + CO_2$

In a preferred embodiment, the systems and processes of the present invention provide a new concept of electrochemical water gas shift reaction which not only removes CO from $H_2$ fuel stream to fuel cells, but also uses the CO as an energy source for splitting water ($H_2O$) for the production of $H_2$. The process can be applied for the complete on-board removal of low-level CO from $H_2$ at room temperature and atmospheric pressure. The process can also be used as an off-board application to replace the currently used low temperature water gas shift. The process uses a modified humidifier, so no additional devices are needed in a $H_2$ fuel cell system.

FIG. 1 is a schematic flow diagram for the deep removal of a ppm concentration of CO and other impurities using electrochemical WGS according to the present invention. The flow diagram shows the process for the removal of low level CO and other impurities from the PEM fuel cell anode $H_2$ feed stream. The $H_2$ stream, containing ppm level of CO, is introduced to the anode of the electrolyzer where most of the CO is adsorbed onto the surface of the electro-catalyst, while a small portion of the remaining CO is absorbed by the aqueous electrolyte. After CO adsorption, pure hydrogen is sent to the PEM fuel cell where it is converted into electricity. A small portion of electricity generated from the fuel cell is applied to the electrolyzer to split $H_2O$ into $O_2$ and $H_2$. CO adsorbed on the surface of the electro-catalyst is oxidized into $CO_2$ plus two protons ($H^+$). The protons are reduced at the cathode of the electrolyzer to $H_2$, which is then combined with the purified $H_2$ stream and fed to the fuel cell. A very small portion of the generated electrical energy is applied through a controller to the electrolyzer to carry out the electrochemical WGS.

The electrodes reactions at the electrolyzer are describes as follows:

Anode Reaction: $CO + Pt = Pt\text{—}CO$ $H_2O + Pt = Pt\text{—}OH + H$ $H = H^+ + e^-$ $PT\text{-}CO + Pt\text{—}OH = 2Pt + CO_2 + H^+ + e^-$ Cathode Reaction: $2H^+ + 2e^- = H_2(g)$ Overall Reaction: $CO + H_2O = CO_2 + H_2, \Delta E = 0.4$ to $\sim 0.06$ V.

As shown in FIG. 1, in the electrolyzer CO is adsorbed and stored on the catalyst surface and absorbed by the aqueous electrolyte until the absorber is saturated with CO reaching a breakthrough condition. This step is carried out at room temperature without the addition of heat or electricity or $O_2$ into the adsorber. If the CO concentration is low and the CO storage capacity of the catalyst in the adsorber is high enough, the breakthrough time for the absorber can be prolonged for several hours without applying electricity to convert it to $CO_2$. After the electrocatalyst surface of the electrolyzer is saturated with CO, electricity is applied to the electrolyzer to split $H_2$ into $OH^-$ and $H^+$. The $OH^-$ group reacts with the adsorbed CO on the catalyst surface of the electrolyzer and converts it to $CO_2$, while given $H_2$ produced in the cathode combines with the purified $H_2$ stream and is fed to the fuel cell. Because of the separation of CO adsorption and CO removal, the $H_2$ loss during the CO oxidation is minimized.

As long as CO breakthrough time is greater than CO removal time, the as proposed EWGS can be operated in two parallel reactor systems, one reactor serves as a CO adsorber and at the same time, the alternative one as an CO remover (electrolyzer). Two reactors can be shifted according to the CO breakthrough time. During the electrolytic process no $H_2$ passes through the electrolyzer so there would not be an $H_2$ oxidation issue. Differing from other conventional process, the alternative operation for removing CO for the adsorber could avoid the $H_2$ fuel loss issue that needs to be dealt with for conventional processes.

The advantages of this alternative operation are as follows. First, CO breakthrough time of an adsorber depends upon CO concentration in an $H_2$, adsorbent, and its volume. Since CO concentration in an $H_2$ stream is at a very low level (ppm), a CO adsorber therefore can have a reasonably long time period for CO storage in an on-board condition. Second, CO adsorption is favored at low temperature conditions. An ambient temperature will promote CO adsorption. In a CO adsorption process, no energy is needed so the total energy requirement to remove CO is only needed in its oxidation process at a brief time period. Comparing to conventional processes that operate continuously the EWGS process may reduce the energy required to maintain the reactor temperature. Third, when CO on the catalyst surface is saturated with CO its concentration reaches the highest level and therefore thermochemically is more reactive and easy to be removed.

Experiments Performed

Three case studies were performed to examine barriers and investigate the scientific merits of the novel electrochemical water gas shift process and system. Also, the impact and success level of the process were identified. For the purpose of these experiments, two fuel cells, purchased from Fuel Cell Technologies, were used. One fuel cell was used as an electrolyzer to purify the $H_2$ feed stream, and another one was used to investigate the performance. The operating conditions of the electrolyzer in all of the experiments were set to approximately 25° C., 1 atm, and approximately 100% relative humidity. The electrolyzer consists of an approximately 25 cm² membrane electrode assembly (MEA) and approximately 0.4 mg/cm⁻² Pt loading on carbon. The volume of the flow channels in both the anode and the cathode was approximately 0.875 mL. Two gas tanks containing 500 ppm CO in high purity $N_2$ gas and 100 ppm CO in $H_2$ were purchased from Linde Gas LLC. Those gases were served as CO sources for the investigation of the effect of CO removal in the EWGS processes. Potentiosatatic measurement and linear sweep voltammetry were carried out using a potentiostat (Model 263A, Princeton Applied Research). The measurement of low level of impurity gases in $H_2$, stream was carried out using a GC/MS (JEOL GC mate-II GC/MS-MS) to the gas samples before and after the electrolyzer.

Figures 2A, 2B:
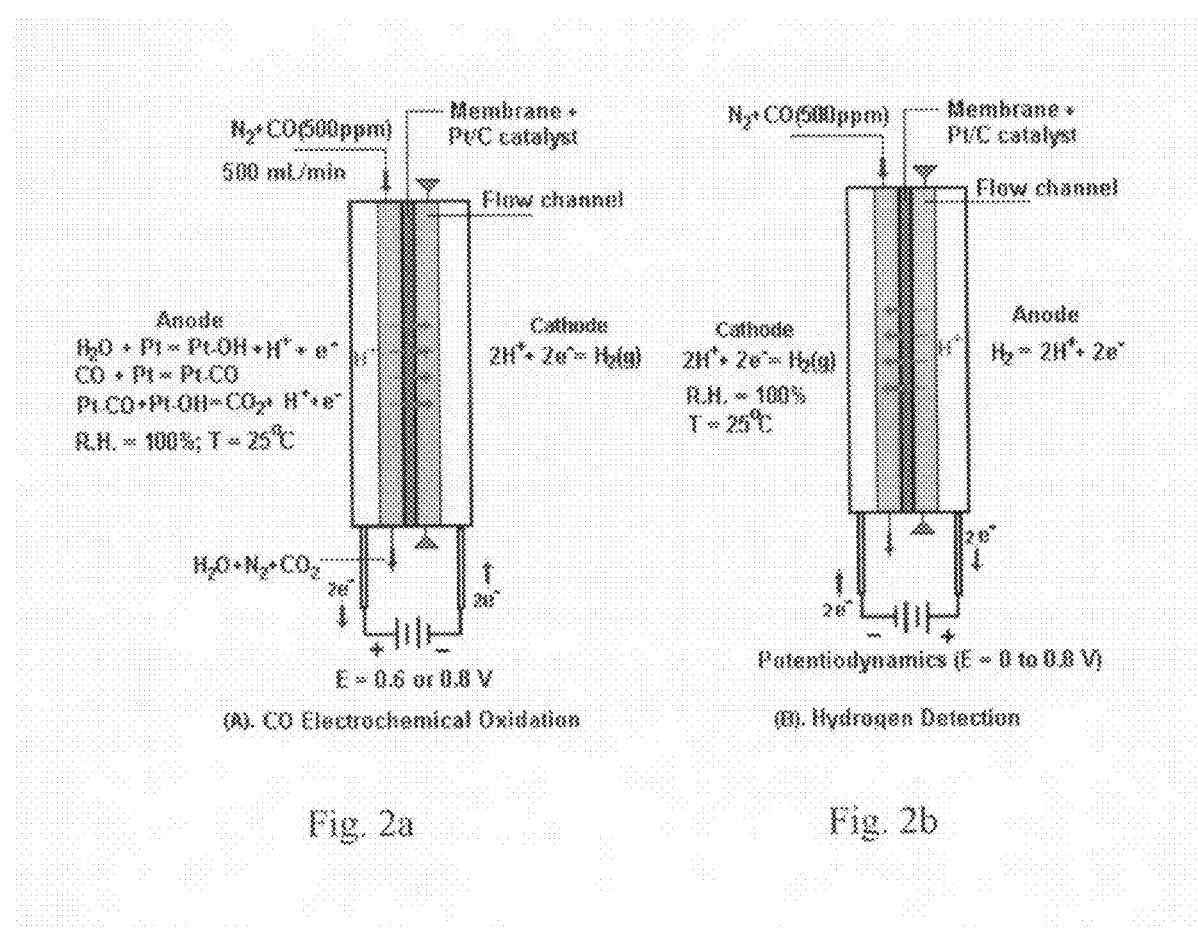
FIG. 2a shows CO electrochemical oxidation of an electrochemical gas water shift reaction according to the present invention.
FIG. 2b shows hydrogen detection of electrochemical gas water shift reaction according to the present invention.

In order to demonstrate that CO can be electrochemically oxidized to $CO_2$ while, at the same time, $H_2O$ is reduced to produce $H_2$, it is necessary to detect the low concentration of $H_2$ produced at the cathode of the electrolyzer. In the first step of the experiment shown in FIG. 2a, an approximately 500 ml/min of ultra pure $N_2$ stream containing approximately 500 ppm CO was introduced to the anode of the electrolyzer modified from a PEM fuel cell. A potentiostatic measurement was carried out by applying potential of approximately 0.6 or approximately 0.8 volts between the two electrodes for 30 minutes. Protons ($H^+$) produced at the anode migrated through the MEA and were reduced to $H_2$ in the cathode. Because both inlet and outlet ends of the cathode were sealed $H_2$ produced is stored in the cathode compartment. As shown in FIG. 2b, in the second step of the experiment, a linear sweep voltammetry (from 0 to 1.0 V) was performed to detect $H_2$ stored in the cathode of the electrolyzer.

Figure 3:
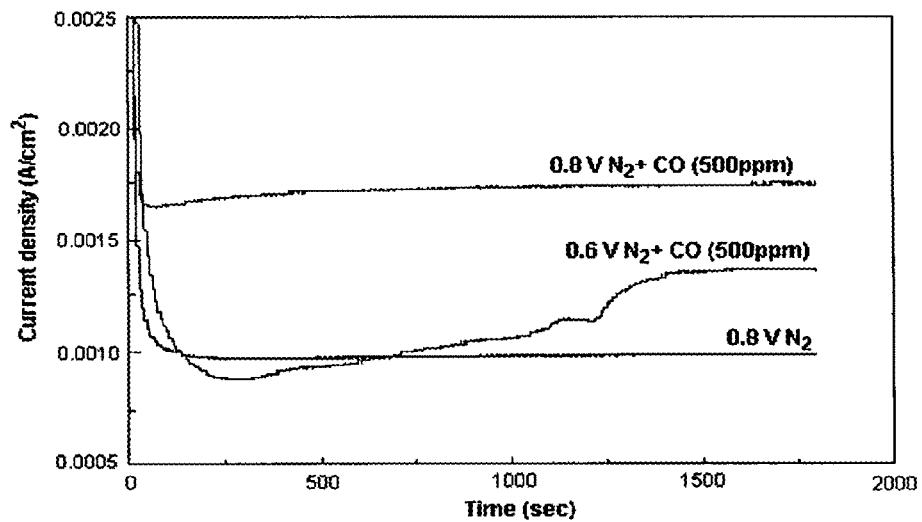
FIG. 3 is a graph showing potentiostatic measurements of $N_2$+CO (500 ppm) stream.

Based on the potentiostatic measurement of $N_2$+CO stream shown in FIG. 3, CO conversion, which is equal to the $H_2$ yield, is calculated using Faraday's Law as 52.28% and the power input for electrochemical water gas shift is estimated at approximately WGS=(0.8V)(0.00075 A/$cm^2$)(25 $cm^2$)=0.015 W. That indicates that the electrical energy required for WGS reaction is a very small value. The potentiodynamic curves shown in FIG. 4 show a typical $H_2$ peak at 0.2 V for both 0.6 V and 0.8 V electrolytic processes that confirm the production of $H_2$ during the electrochemical water gas shift WGS according to the present invention.

Figure 4:
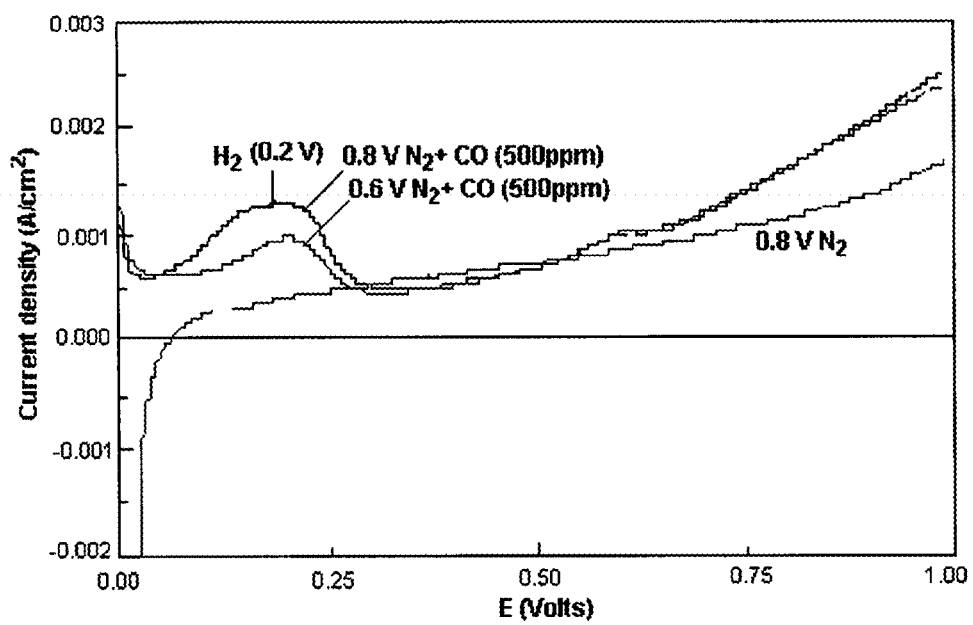
FIG. 4 is a graph showing potentiodynamic curves of $N_2$+CO (500 ppm).

The detection of $H_2$ is shown in FIGS. 3 and 4. When a potential is applied between the anode and cathode of the electrolyzer as shown in FIG. 2b, the steady state current density under the potential of 0.8 V for $N_2$ and water system is about 0.001 A/$cm^2$. Compared to the blank test, the current densities for the $N_2$+CO+ water system increase to 0.00175 A/$cm^2$ for potential 0.8 V and 0.0015 A/$cm^2$ for 0.6 V potential, respectively. The increased current density indicate the generation of $H_2$ from an EWGS process because a Nafion membrane used in this electrolyzer is only conductive to $H^+$ but not conductive to electrons. Therefore, the current increase must result from the migration of protons ($H^+$) through the Nafion membrane from the anode to cathode of the electrolyzer. FIG. 4 proves that $H_2$ is detected at the cathode of the electrolyzer. As discussed in the following section, $H_2$ generated must result from as EWGS process of the present invention, not other mechanisms.

In the case of the $N_2$+CO system under an approximately 100% humidity, no initial $H_2$ was inlet to the electrolyzer. Any $H_2$ detected came from electrochemical processes when electrical potential was applied. There are basically three possible mechanisms that can generate $H_2$:
(1) Water electrolysis ($H_2O+\Delta E = H_2+0.5O_2$);
(2) Water carbon reformation ($H_2O+C+\Delta E=CO+H_2$). Carbon here refers to the support of Pt/C catalyst
(3) Water gas shift reaction ($H_2O+CO+\Delta E=CO_2+H_2$). The blank test for pure $N_2$ system (FIGS. 3 and 4, curve 0.8 V $N_2$) showed that there was no $H_2$ detected at the cathode of the electrolyzer, implying that under 0.8 V potential water will be reduced to generate $H_2$ because water electrolysis requires a potential greater than 1.23 V. The blank test result also shows that water carbon reforming is not possible as no $H_2$ peak is detected (FIG. 4, curve 0.8 V $N_2$). Therefore, all these possibilities are precluded and the only source of $H_2$ must be from the EWGS reaction.

Figures 5A, 5B, 5C:
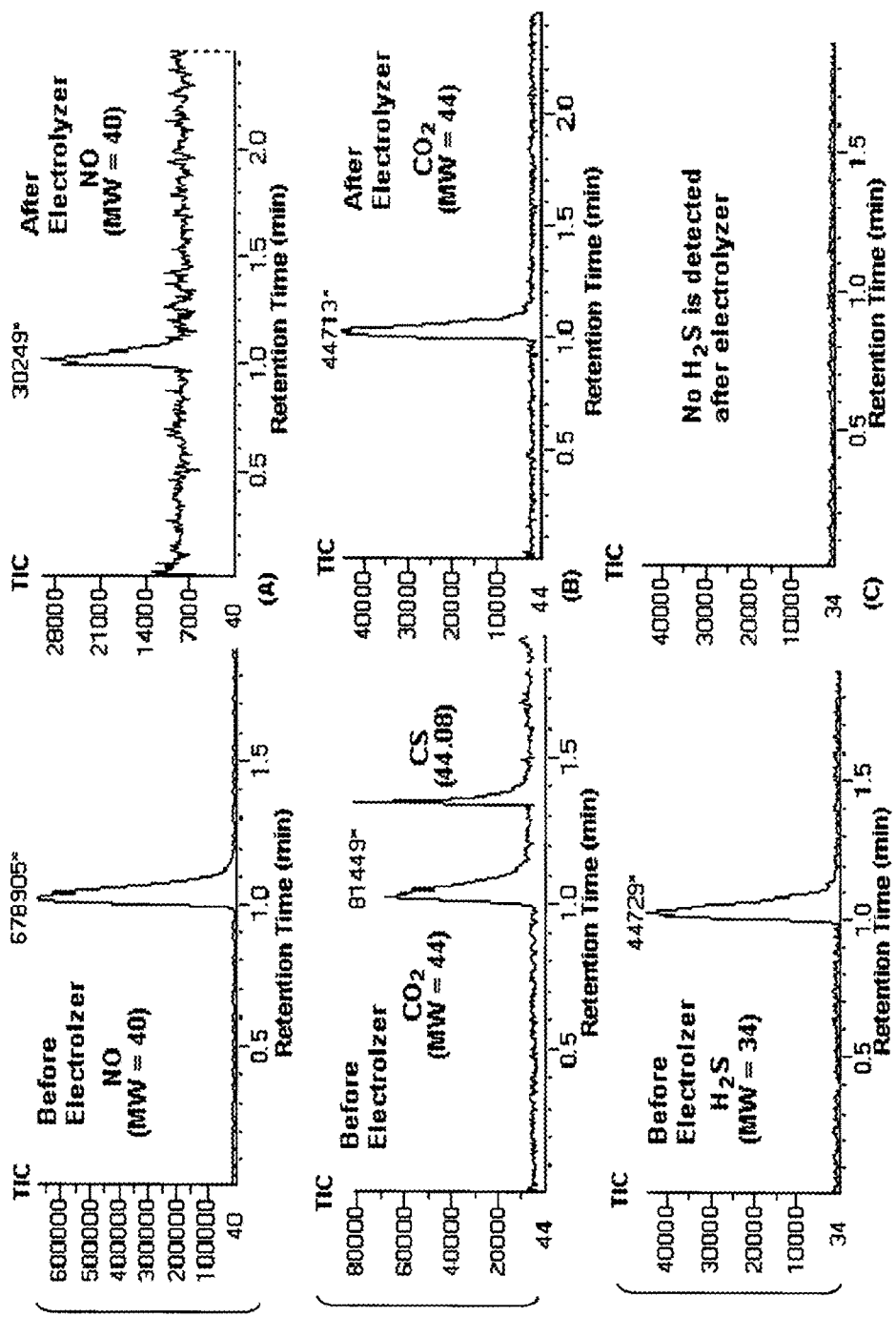
FIG. 5a is before and after graphs showing that approximately 50% of CO and NO were adsorbed by the electrolyzer at approximately 500 ml·min$^{-2}$ and space time of approximately 0.11 second.
FIG. 5b is before and after graphs showing that the carbon monosulfide and hydrogen sulfide were completely adsorbed.
FIG. 5c is before and after graphs showing that the carbon monosulfide and hydrogen sulfide were completely adsorbed.

A gas chromatograph-mass spectrometer (GC/MS) measurements were carried out to test the impurity level before introducing N2+CO stream to the EWGS electrolyzer. The results of the CO adsorption and other impurity gases are shown in FIG. 5. FIG. 5a shows that approximately 50% of the nitrogen monoxide NO was adsorbed by the electrolyzer at approximately 500 mL/$min^{-2}$ and residence time of approximately 0.11 second calculated upon the volume of 0.875 mL for the anode flow chamber. FIGS. 5b and 5c show that the carbon monosulfide (CS) and hydrogen sulfide ($H_2S$) were completely adsorbed. Interestingly, $CO_2$ in $N_2$ is also detected before the electrolyzer, indicating that there already exists $CO_2$ in the $N_2$ and CO gas mixture. After the electrolyzer, $CO_2$ is produced by the EWGS reaction and has a higher concentration than that before the electrolyzer. However, the result of GS/MS measurement indicates (FIG. 5b) that there is only 50% of the $CO_2$ detected in the outlet stream of the electrolyzer, suggesting that the electrolyzer has a capability for $CO_2$ adsorption.

Based on these results, we can conclude that it is highly possible that other sulfur-based compound gases, such as sulfur dioxide ($SO_2$), carbonyl sulfide (COS), and carbon disulfide ($CS_2$) can also be adsorbed and eliminated via the EWGS process. Similarly, the electrolyzer could also be used for the adsorption of trace amount of impurity nitrogen dioxide ($NO_2$) and ammonia, ($NH_3$) with high efficiency and a short residence time. The elimination of these ppb level impurity gases in an $H_2$ fuel stream enhances the performance of a PEM fuel cell.

Figure 6:
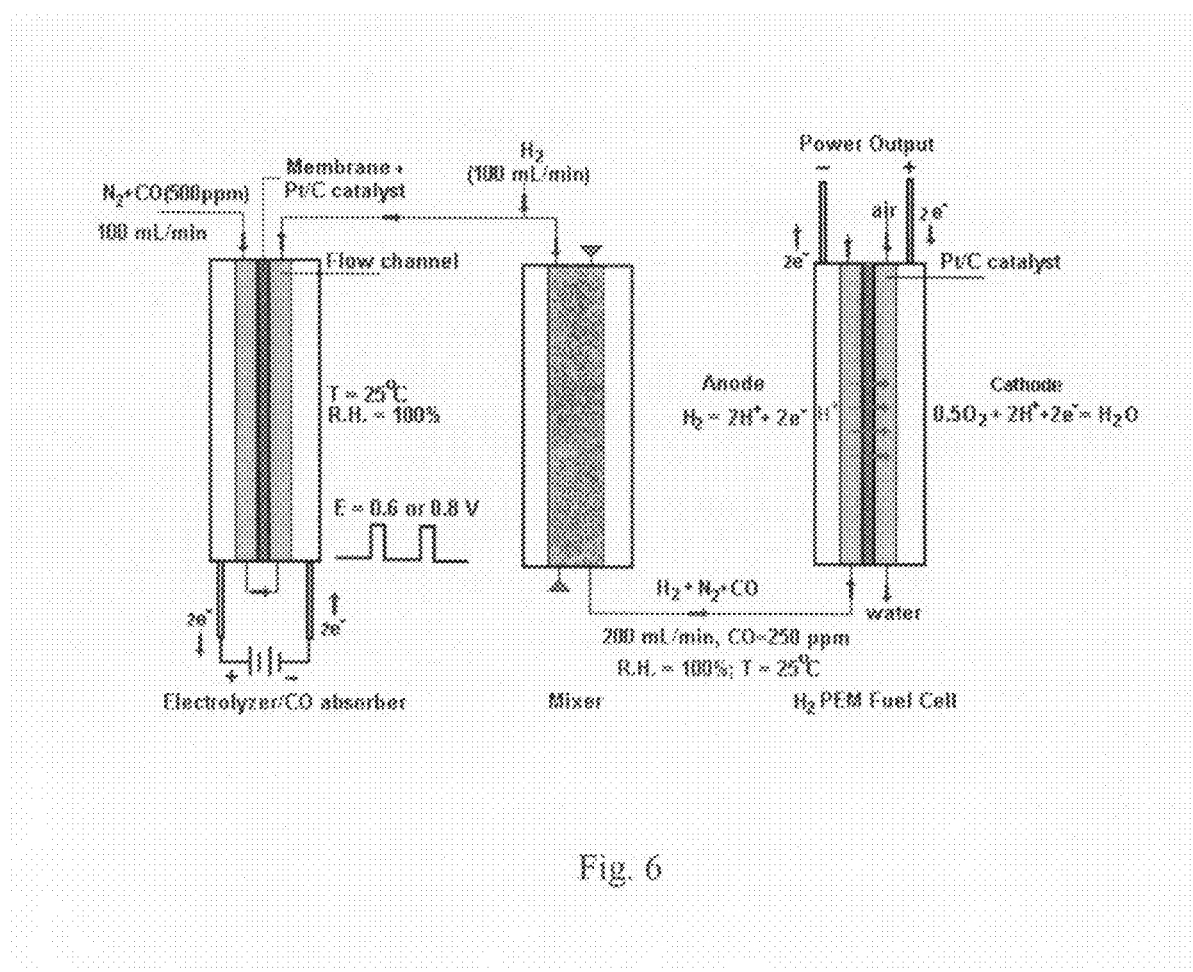
FIG. 6 is a schematic flow diagram showing a carbon monoxide electrolyzer and hydrogen polymer electrolyte membrane fuel cell.

In a second case study, 500 ppm CO in excess $N_2$ stream with 100 mL/min flow rate was introduced to the electrolyzer. After the EWGS, the purified outlet stream from the electrolyzer was mixed with a pure $H_2$ stream with a flow rate of 100 mL/min. and fed into a PEM fuel cell. FIG. 6 is a schematic flow diagram showing an experimental setup for measuring polymer electrolyte membrane fuel cell performance ($N_2$+$H_2$+CO (250 ppm)). A fuel cell testing station was applied to monitor the cell output voltage as a function of CO removal at a constant current density of 200 mA/$cm^2$. The purpose of this case study is to investigate the effect of CO removal on the performance of a PEM fuel cell. The introduction of an $N_2$+CO is not to simulate a real $H_2$ fuel cell system, rather, to investigate the EWGS process simultaneously monitoring the output voltage of a fuel cell. Since use of a $H_2$+CO fuel stream can not be used to conduct the present experiment because the test stand does not allow application of a potential to the electrolyzer for the $H_2$+CO stream because the migration of $H^+$ under a potential greater than 0.2 V causes electrical current in excess of the maximum allowable value of the test stand. This limits testing to fuel cell performance during the electrolysis process. In other words, for an $H_2$+CO system, the test of the fuel cell performance has to be separated for the electrolysis process. This is the main reason why an $N_2$+CO system was applied in this case study.

Figure 7:
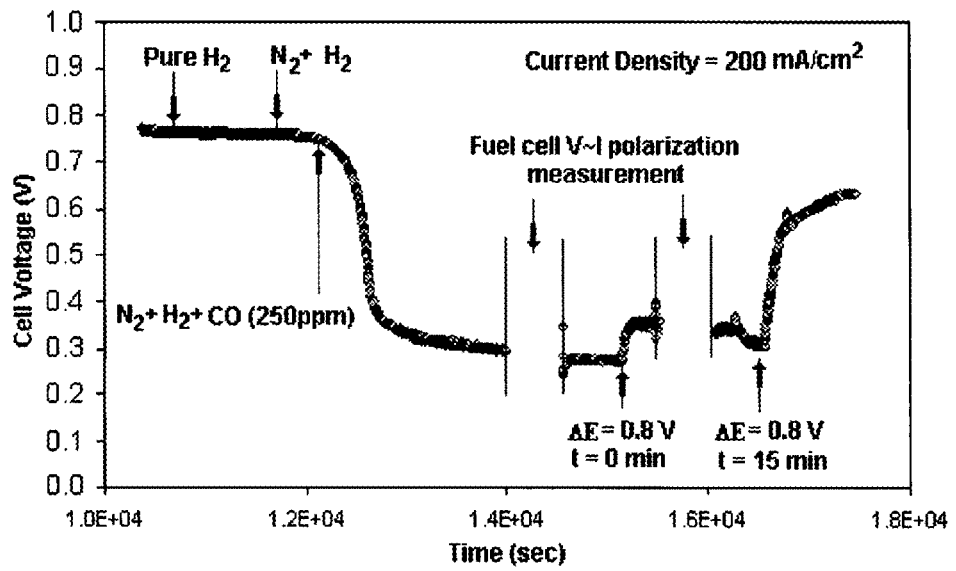
FIG. 7 is a graph showing fuel cell performance with or without carbon monoxide removal.
Figure 8:
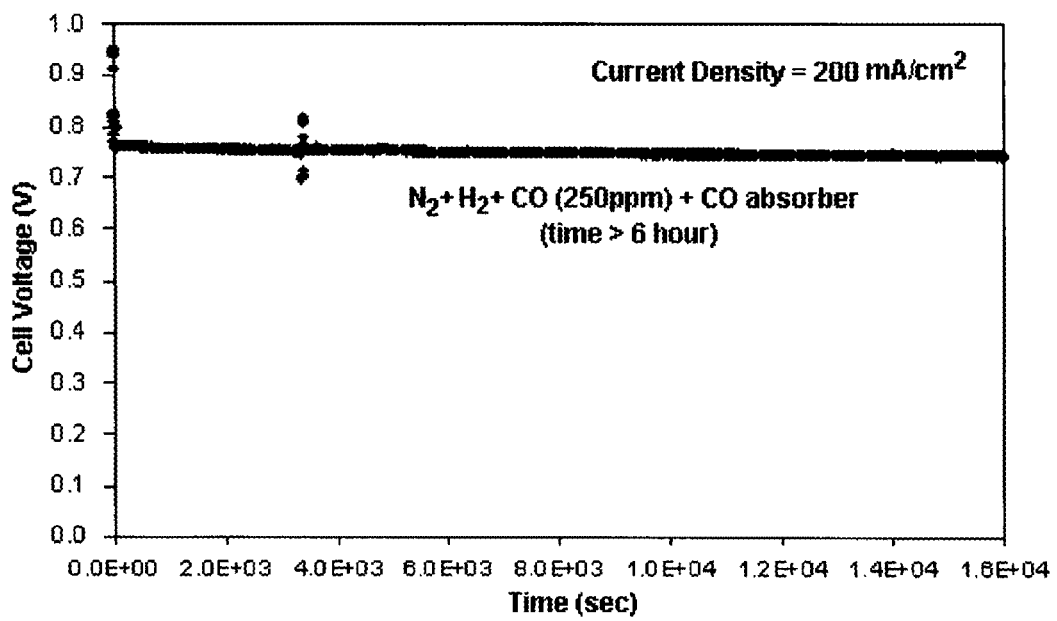
FIG. 8 is a graph showing fuel cell performance including carbon monoxide absorber as a function of cell voltage and time at a constant current density.

The results of the fuel cell performance are shown in FIGS. 7 and 8. As shown in FIG. 7, the fuel cell output voltage dropped significantly when the $N_2$+CO stream was mixed with H2 stream containing approximately 250 ppm CO and was fed to the fuel cell. When applying 0.8 V potential to the electrolyzer, CO was oxidized to $CO_2$ rapidly, and the fuel cell output voltage increased simultaneously. After electrolyzing for 15 min, the potential applied to the electrolyzer was turned off. The fuel cell output voltage was gradually improved to a pure $H_2$ level at 0.757 V. The fuel cell output voltage under a current density of approximately 200 mA/$cm^2$ only decreased slightly after more than six hours. This result indicates that the electrolyzer could continuously adsorb CO up to six hours before it was saturated with CO. To confirm this finding, the electrolyzer was disconnected and $N_2$+CO was introduced directly into the main $H_2$ stream and then the gas mixture was introduced to the fuel cell. This caused the output voltage of the fuel cell to drop immediately to the initial $N_2$+CO+$H_2$ fuel level (approximately 0.3 V). After reconnecting the electrolyzer the fuel cell voltage was restored to about 0.75 V. With this result, it is concluded that even though electricity is turn off, the electrolyzer still has a capability to adsorb CO for a few hours to maintain a high fuel cell output voltage. The measurements of fuel cell polarization curve (V~I) under different current densities were also conducted as shown in FIG. 7. FIG. 8 is a graph showing the approximate fuel cell performance (fuel cell+CO absorber). As shown, fuel cell performance immediately improved to pure $H_2$ level with an output voltage of 0.757 V for more than six hours.

Figure 9:
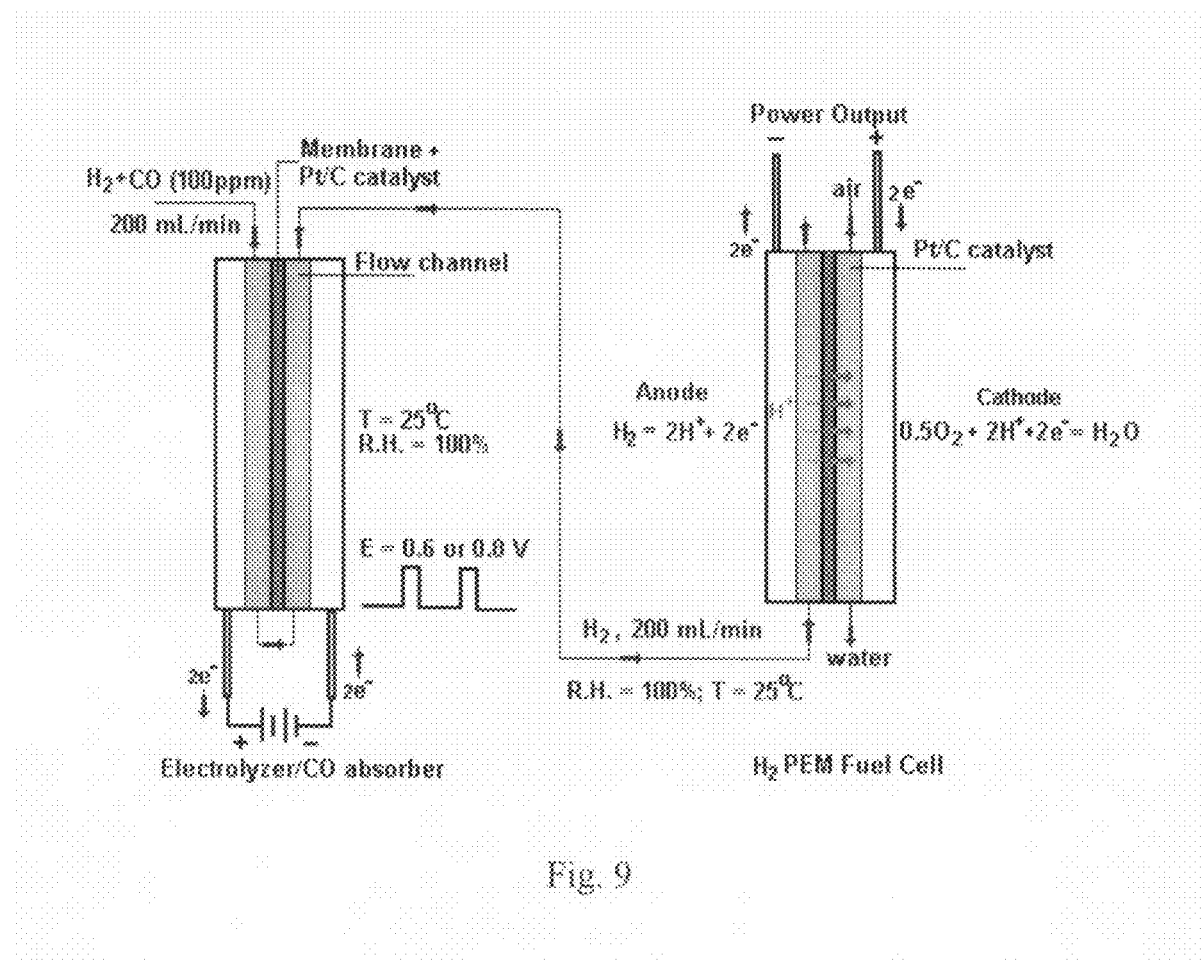
FIG. 9 is a schematic flow diagram of an electrolyzer for carbon monoxide absorption for testing fuel cell performance.

The objective of the third experiment was to investigate the electrochemical removal of CO from the $H_2$ stream. The experimental configuration is shown in FIG. 9. During the experiment, a $H_2$ stream containing 100 ppm of CO was fed to an electrolyzer at a flow rate of 200 mL/min. The electrolyzer was operated by a potentiostat at room temperature and atmosphere pressure and saturated at approximately 100% water vapor.

Figure 10:
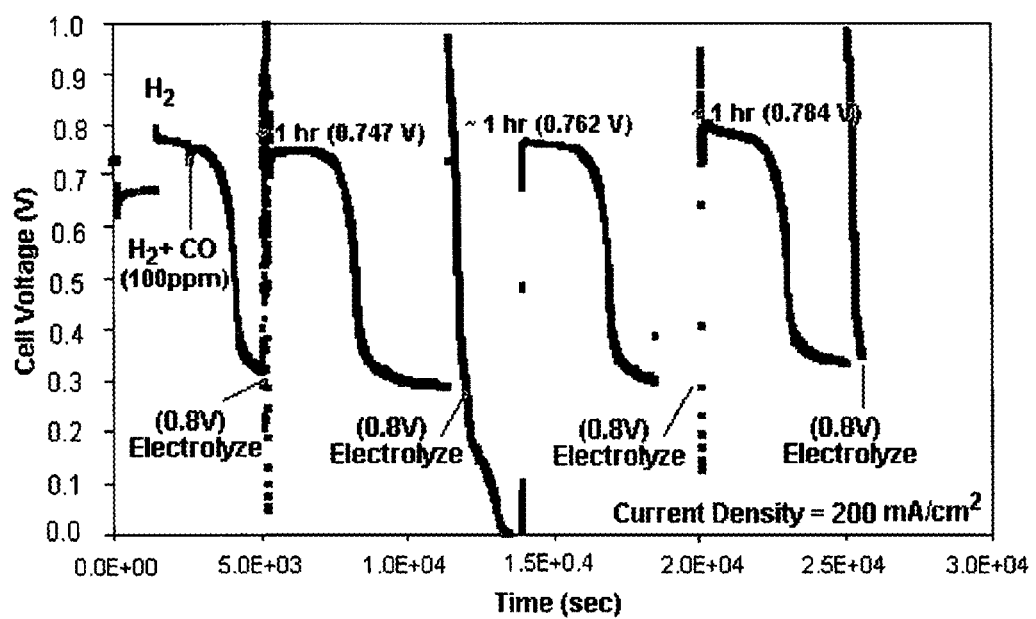
FIG. 10 is a graph showing performance of a polymer electrolyte membrane fuel cell as a function of cell voltage and time.

FIG. 10 is a graph showing the effects of CO removal on the performance of a PEM fuel cell. When 100 ppm CO was added to the $H_2$ fuel stream, the fuel cell output voltage dropped significantly. When the cell voltage reached a minimum level of approximately 0.3 V, the $H_2$+CO fuel supply to the system was shut down and the test stand automatically switched from $H_2$+CO fuel to $N_2$ gas inlet to the electrolyzer and the fuel cell system in order to protect the cell from damage. In a real system, no $N_2$ is needed to flush the adsorbed CO from an electrolyzer. In fact, $N_2$ flush will not reduce the CO absorption because $N_2$ does not competitively adsorb on the Pt catalyst with CO. With the $N_2$ stream provided by the fuel cell test stand to the electrolyzer, a potential of 0.8 V to the electrolyzer for 10 to 15 minutes (an arbitrary time) was applied to remove CO from the $N_2$ stream. After that, an $H_2$+100 ppm CO fuel was reconnected from the test stand to the electrolyzer and the fuel cell to record the output voltage of the fuel cell. The process was repeated for four times as shown in FIG. 10 to verify the capability to regenerate the electrocatalyst in the electrolyzer under an $H_2$+CO feed stream. Although in this preliminary experiment we did not directly measure the CO concentration at the outlet of the electrolyzer, the output voltage of the fuel cell could serve as an indicator for indirectly monitoring the effect of CO removal.

One interesting observation is shown in FIG. 10. After the electrochemical water gas shift process of the present invention, the fuel cell output voltage recovered to slightly higher level than that of the pure hydrogen input condition from approximately 0.747 V to 0.762 V to approximately 0.784 V. The FIG. 10 also shows that the CO breakthrough time can reach up to one hour as indicated in the fuel cell output voltage curve. Each experimental run after the electrolytic process, the cell voltage increased slightly. This effect may due to the fact that other impurity gases (i.e. sulfur-based components) in the $H_2$ stream were also removed by the electrolyzer as indicated by the GC-MS measurements shown in FIG. 5.

It should be pointed out that the CO breakthrough time in the $H_2$ stream is much less than that in the $N_2$ stream. This result may be attributed to the competitive adsorption of $H_2$ in the electrocatalyst leading to the reduction of CO storage capability. The one hour CO storage time in this experiment could also be prolonged by selecting a better electrolyte or increase the volume of the anode flow chamber. The volume of the electrolyzer in this example is 0.875 mL and the breakthrough time is about one hour as shown in FIG. 10, with CO concentration of 100 ppm. If CO concentration in an $H_2$ is 10 ppm, or if the volume of the electrolyzer increases by a factor of 10, the breakthrough time can be increased to 10 hours, meaning that in this time period the electrolyzer has a capacity to store CO up to 10 hours indicating that the design of the present invention has potential to enable an $H_2$ powered vehicle to drive for a few hours before electricity would have to be applied to remove CO, and the process can occur at ambient temperature and pressure.

As previously discussed, if the CO removal time is shorter than CO storage time, CO removal can operate between two parallel systems with one electrolyzer serving as a CO adsorber and the alternative one as a CO remover. Two systems can be shifted according to the CO breakthrough time. During the electrolytic process no $H_2$ will pass through the electrolyzer so there would not be an $H_2$ oxidation issue. This differs from conventional processes that operate under a continuous condition requiring energy to maintain the reactor's temperature all the time and $H_2$ loss can not be avoided. Compared to CO removal time, (10 to 15 min in this case study), the CO breakthrough time of approximately 1 hour is about four to six times longer than the removal time. This result shows a possibility of application of this technology in an on board condition.

The proposed EWGS process of the present invention is effective for the removal of a ppm level CO and trace amount of other impurities from an $H_2$ stream. The EWGS can be a rapid reaction for CO removal. Two electrolyzer systems can be operated alternatively for on board applications using a pulse power supply at ambient conditions and 100% relative humidity. The CO breakthrough time for a Pt/C catalyst can be extended to about one hour for 100 ppm CO in an $H_2$ stream. The effect of electrochemical removal of CO on the performance of PEM fuel cells shows that the process is safe since no on-board oxygen or air sources are needed. The process is also highly efficient because the CO serves as a fuel for the production of $H_2$. Furthermore, the electrolyzer is stable under electrochemical conditions for more than 70 hours without showing any sign of catalyst degradation.

Advantages of the electrochemical WGS reaction of the present invention include operating the electrolyzer at approximately 25° C., approximately 1 atm and approximately 100% relative humidity, while the operating conditions of the fuel cell are approximately 60-80° C., 1 atm and approximately 100% relative humidity. Therefore, conditions are favorable for on board application. Another advantage is high efficiency. Differing from conventional technologies such as CO preferential oxidation and CO methanation where temperature requirements are high and $H_2$ loss can not be avoided, the electrolyzer of the present invention operates at ambient conditions, generates $H_2$ and minimizes $H_2$ fuel loss. Third advantage is efficient electricity input to the electrolyzer. The WGS of the electrolyzer first serves as a CO adsorber. One it is saturated with CO, then a potential is applied to oxidize CO to $CO_2$ while reducing water to $H_2$. Thus, the electrochemical potential is a pulse-type shortening the electricity consumption as shown in FIG. 3. As previously described and shown in FIG. 3, the electricity consumption for CO oxidation is 0.015 W based on 500 ml $min^{-1}$ $N_2$ and 500 ppm CO.

Other advantages include absorption of other impurity gases from the hydrogen stream and no air or $O_2$ input and $H_2$ loss. The electrolyzer absorbs other impurity gases in the hydrogen stream such as NO, $H_2S$, and CS, and $CO_2$ as shown in FIG. 5. According to the present invention, the process does not require $O_2$ or air input. $H_2$, produced from the oxidizing oxidizing CO and is added to the already purified $H_2$ stream increasing the process efficiency.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for removal of ppm level carbon monoxide from hydrogen stream consisting essentially of the steps of:
introducing the hydrogen stream having the low level carbon monoxide therein to one single electrolyzer immersed in aqueous electrolyte consisting of liquid water at ambient temperature and pressure, the electrolyzer having one single anode and one single cathode independent of the anode both immersed in the liquid water;
applying an electrical pulse through a controller to the electrolyzer to carry out an electrochemical water gas shift reaction, the electrical pulse applied between the anode and the cathode of the electrolyzer alternating between a positive voltage potential and a zero voltage potential to alternately operate the one single electrolyzer as a carbon monoxide adsorber on the anode side of the one single electrolyzer and as a carbon monoxide remover on the cathode side of the one single electrolyzer;
adsorbing the carbon monoxide onto a porous anode surface submerged in the liquid water contained within the electrolyzer when the voltage potential is zero;
removing the carbon monoxide when the voltage potential is positive, wherein the electrochemical water gas shift reaction is performed at ambient temperature and pressure;
using the removed carbon monoxide to electrochemically react with the liquid water in the electrolyzer to produce hydrogen and carbon dioxide which is dissolved in liquid water without releasing carbon dioxide into the atmosphere; and
wherein the method implements a closed electrochemical water gas shift reaction at ambient temperature and pressure wherein only carbon monoxide is consumed.

2. The method of claim 1, wherein the removing step comprises the step of:
applying an electrical energy to the second electrolyzer to oxidize carbon monoxide into carbon dioxide and reduce water to hydrogen.

3. The method of claim 2, wherein the electrical energy application step comprises the steps of:
generating the electrical energy by an on-board hydrogen polymer electrolyte membrane fuel cell.

4. The method of claim 2, wherein the removing step comprises the step of:
oxidizing the carbon monoxide to carbon dioxide, wherein the oxidation does not require on-board oxygen or air supplies.

5. The method of claim 1, further comprising the step of:
using the carbon monoxide as a reducing agent to reduce water to hydrogen to minimize energy consumption.

6. The method of claim 1, further comprising the step of:
using the electrochemical water gas shift reaction for on-board removal of carbon monoxide in a hydrogen polymer electrolyte membrane (PEM) fuel cell.

7. The method of claim 1, further comprising the steps of:
adsorbing sulfur-based compound gases into the electrolyzer anode; and
removing the sulfur-based compound gases from the hydrogen stream.

8. The method of claim 7, wherein the sulfur-based compound gases absorbing step comprises the step of:
eliminating at least one of a low level sulfur dioxide, carbonyl sulfide, and carbon disulfide and hydrogen sulfide from the hydrogen stream.

9. The method of claim 1, wherein the removing carbon monoxide from the hydrogen stream step comprises the steps of:
oxidizing the carbon monoxide adsorbed on the anode into carbon dioxide plus two protons;
reducing the protons at a cathode of the electrolyzer to produce hydrogen;
combining the hydrogen produced with the hydrogen stream; and
feeding the combined hydrogen stream to a hydrogen PEM fuel cell connected with the electrolyzer for the production of electrical energy, wherein separation of the carbon monoxide adsorption and carbon monoxide removal reduces the hydrogen loss during carbon monoxide oxidization.

10. The method of claim 1, wherein the adsorbing carbon monoxide step comprises the steps of:
adsorbing carbon monoxide onto a surface of an anode electro-catalyst.

11. The method of claim 1, further comprising the step of:
using a modified on-board humidifier as the electrolizer in a hydrogen PEM fuel cell.

* * * * *